United States Patent
Hiraguchi

(10) Patent No.: US 7,145,751 B2
(45) Date of Patent: Dec. 5, 2006

(54) RECORDING MEDIA CARTRIDGE HAVING A MEMORY ACCESSIBLE FROM MULTIPLE DIRECTIONS

(75) Inventor: Kazuo Hiraguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 181 days.

(21) Appl. No.: 11/222,861

(22) Filed: Sep. 12, 2005

(65) Prior Publication Data

US 2006/0007595 A1    Jan. 12, 2006

Related U.S. Application Data

(62) Division of application No. 10/401,028, filed on Mar. 28, 2003, now Pat. No. 6,958,887.

(30) Foreign Application Priority Data

Mar. 28, 2002  (JP)  ............................. 2002-91299

(51) Int. Cl.
*G11B 23/07* (2006.01)
(52) U.S. Cl. ............................ 360/132
(58) Field of Classification Search ............ None
See application file for complete search history.

(56) References Cited

U.S. PATENT DOCUMENTS

| | | | | |
|---|---|---|---|---|
| 6,172,833 B1 | 1/2001 | Fry et al. | ............ | 360/71 |
| 6,304,416 B1 | 10/2001 | McAllister et al. | ......... | 360/132 |
| 6,421,196 B1 | 7/2002 | Takayama et al. | ............ | 360/71 |
| 6,577,471 B1 | 6/2003 | Morita et al. | ............... | 360/132 |
| 6,598,820 B1 | 7/2003 | Morita | ..................... | 242/348.2 |
| 6,680,817 B1 | 1/2004 | Kano et al. | ................. | 360/132 |
| 6,702,215 B1 | 3/2004 | Stamm et al. | ............. | 242/348 |
| 6,848,643 B1 * | 2/2005 | Hiraguchi | ................... | 242/348 |
| 6,862,157 B1 * | 3/2005 | Tsuyuki et al. | ............. | 360/132 |
| 2001/0043436 A1 | 11/2001 | Onmori et al. | ............. | 360/132 |
| 2004/0042122 A1 | 3/2004 | Honda | ........................ | 360/132 |

FOREIGN PATENT DOCUMENTS

| | | | |
|---|---|---|---|
| JP | 2002-117644 A | 4/2002 |
| JP | 2003-157655 A | 5/2003 |

* cited by examiner

*Primary Examiner*—Jefferson Evans
(74) *Attorney, Agent, or Firm*—Sughrue Mion, PLLC

(57) ABSTRACT

A recording medium cartridge that is housed in a library, extracted from the library by a gripping mechanism, and loaded into a drive device includes a case, within which is housed a recording medium, and a memory, in which is stored information relating to the recording medium and that is noncontactingly accessible by reading and writing devices disposed at the drive device and at the gripping mechanism. A communication surface of the memory is disposed within the case at an angle at which the memory is accessible from at least three directions.

12 Claims, 10 Drawing Sheets

RECORDING MEDIA CARTRIDGE HAVING A MEMORY ACCESSIBLE FROM MULTIPLE DIRECTIONS

BACKGROUND OF THE INVENTION

This is a divisional of U.S. application Ser. No. 10/401,028 filed Mar. 28, 2003 now U.S. Pat. No. 6,958,887. The entire disclosure of U.S. application Ser. No. 10/401,028 is considered part of the disclosure of the accompanying divisional application and is hereby incorporated by reference.

FIELD OF THE INVENTION

The present invention relates to a recording medium cartridge that is mainly used as a recording and playback medium for computers and the like.

DESCRIPTION OF THE RELATED ART

Magnetic tape cartridges including a case within which is housed a single reel wound with magnetic tape that is mainly used as a recording and playback medium for computers and the like have conventionally been known. A leader member, such as a leader block, a leader pin, or a leader tape, is disposed at a leading end of the magnetic tape. A pull-out mechanism disposed at a drive device pulls out the leader member from the magnetic tape cartridge and winds the magnetic tape fixed to the leader member around a take-up reel of the drive device.

A reel gear is annularly disposed in a center of a lower surface of the reel, which is exposed through an open hole that penetrates a lower surface of the magnetic tape cartridge. The reel is rotatingly driven by a drive gear disposed at a rotating shaft of the drive device meshing with the reel gear. Data is recorded on the magnetic tape, and data recorded on the magnetic tape is played back, by synchronously rotating the reel of the magnetic tape cartridge and the take-up reel of the drive device.

Such magnetic tape cartridges are ordinarily housed in a storage called a library. Rear end sides of both side walls of a desired magnetic tape cartridge are gripped by a gripping mechanism including a robotic hand or the like, whereby the magnetic tape cartridge is extracted from a storage unit of the library. By loading the extracted magnetic tape cartridge into one of several drive devices, data is recorded in the magnetic tape cartridge or data that is recorded in the magnetic tape cartridge is played back.

A card-type memory board, in which is recorded various information such as the recording format and recording capacity of the magnetic tape cartridge, is disposed at an inner side within a rear wall of each magnetic tape cartridge, so that the magnetic tape cartridge extracted from the library is smoothly loaded into one drive device. In other words, the various information recorded in the memory board is read by a reading and writing device disposed at the drive device and by a reading device disposed at the robotic hand, and a drive device that can record data in the magnetic tape cartridge or play back data recorded in the magnetic tape cartridge is identified in advance by a control device or the like, so that there is no loss in the action of the gripping mechanism such as the robotic hand.

In FIG. 9 is illustrated a conventional magnetic tape cartridge 120. Arrow P in the drawing indicates the direction in which the magnetic tape cartridge 120 is loaded into the drive device. As shown in FIG. 9, a memory board 124 is disposed with an orientation so as to slant at a predetermined angle at an inner side of a rear wall 122D (the wall facing the direction of arrow P is a front wall 122A) of the magnetic tape cartridge 120. That is, because the robotic hand is a structure that grips the rear end sides of left and right side walls 122B and 122C of the magnetic tape cartridge 120, a reading device 108 is structured to access the memory board 124 from a rear surface of the magnetic tape cartridge 120, i.e., from the rear wall 122D. Because the magnetic tape cartridge 120 that has been loaded into the drive device has a structure in which it is completed loaded into the drive device by the lowering of a bucket (e.g., refer to 102 in FIG. 8), a reading and writing device 106 is structured to access the memory board 124 from a lower surface 121 of the magnetic tape cartridge 124.

Accordingly, the memory board 124 is disposed at an wave angle of 45° when seen in side view so that it can be accessed from both the rear wall 122D and the lower surface 121 (i.e., from two directions). When the memory board 124 is disposed with this orientation, it is possible for the memory board 124 to be accessed by an electromagnetic wave that is transmitted and received from the reading device 108, which is disposed at the rear wall 122D, and it is possible for the memory board 124 to be accessed by an electromagnetic wave that is transmitted and received from the reading and writing device 106, which is disposed at the lower surface 121. It should be noted that the reading and writing device 106 is a device that can not only read information but can also write information.

However, when the design of the library or the drive device is altered and the reading device 108 or the reading and writing device 106 is of a specification that can only access the memory board 124 from the left or right side surfaces (left wall 122B or right wall 122C) in the direction in which the magnetic tape cartridge 120 is loaded into the drive device (i.e., the direction of arrow P), problems occur in that the memory board 124 cannot be accessed in the above-described configuration.

SUMMARY OF THE INVENTION

It is an object of the present invention to provide a recording medium cartridge in which it is possible to access a memory, such as a memory board, from at least three directions of the recording medium cartridge, namely, from a lower surface side, a rear surface side and a side surface side of the recording medium cartridge.

A recording medium cartridge pertaining to a first aspect of the invention is a recording medium cartridge that is housed in a library, extracted from the library by a gripping mechanism, and loaded into a drive device, the recording medium cartridge comprising: a case within which is housed a recording medium; and a memory in which is stored information relating to the recording medium and that is noncontactingly accessible by reading and writing devices disposed at the drive device and at the gripping mechanism, wherein a communication surface of the memory is disposed within the case at an angle at which the memory is accessible from at least three directions.

In the recording medium cartridge having the above-described structure, it is possible to access the memory from at least three directions. Accordingly, even if the design of the drive device or library housing the magnetic medium cartridge is altered, problems relating to access (i.e., reading and writing) of the memory do not occur. In other words, it is possible to increase the freedom with which the library or drive device is designed.

A recording medium cartridge pertaining to a second aspect of the invention is a recording medium cartridge that is housed in a library, extracted from the library by a gripping mechanism, and loaded into a drive device, the recording medium cartridge comprising: a case within which is housed a recording medium; and a memory that includes a communication surface and in which is stored information relating to the recording medium, wherein the memory is disposed so that a normal line of the communication surface of the memory intersects a plane that is parallel to a thickness direction of the case and to a direction in which the case is loaded into the drive device.

A method of manufacturing a recording medium cartridge pertaining to a third aspect of the invention is a method of manufacturing a recording medium cartridge that is housed in a library, extracted from the library by a gripping mechanism, and loaded into a drive device, the method comprising the steps of: (a) forming a case that houses a recording medium; and (b) disposing a memory that includes a communication surface and in which is stored information relating to the recording medium, so that a normal line of the communication surface of the memory intersects a plane parallel to a thickness direction of the case and a direction in which the case is loaded into the drive device.

DESCRIPTION OF THE PREFERRED EMBODIMENT

Figure 1:
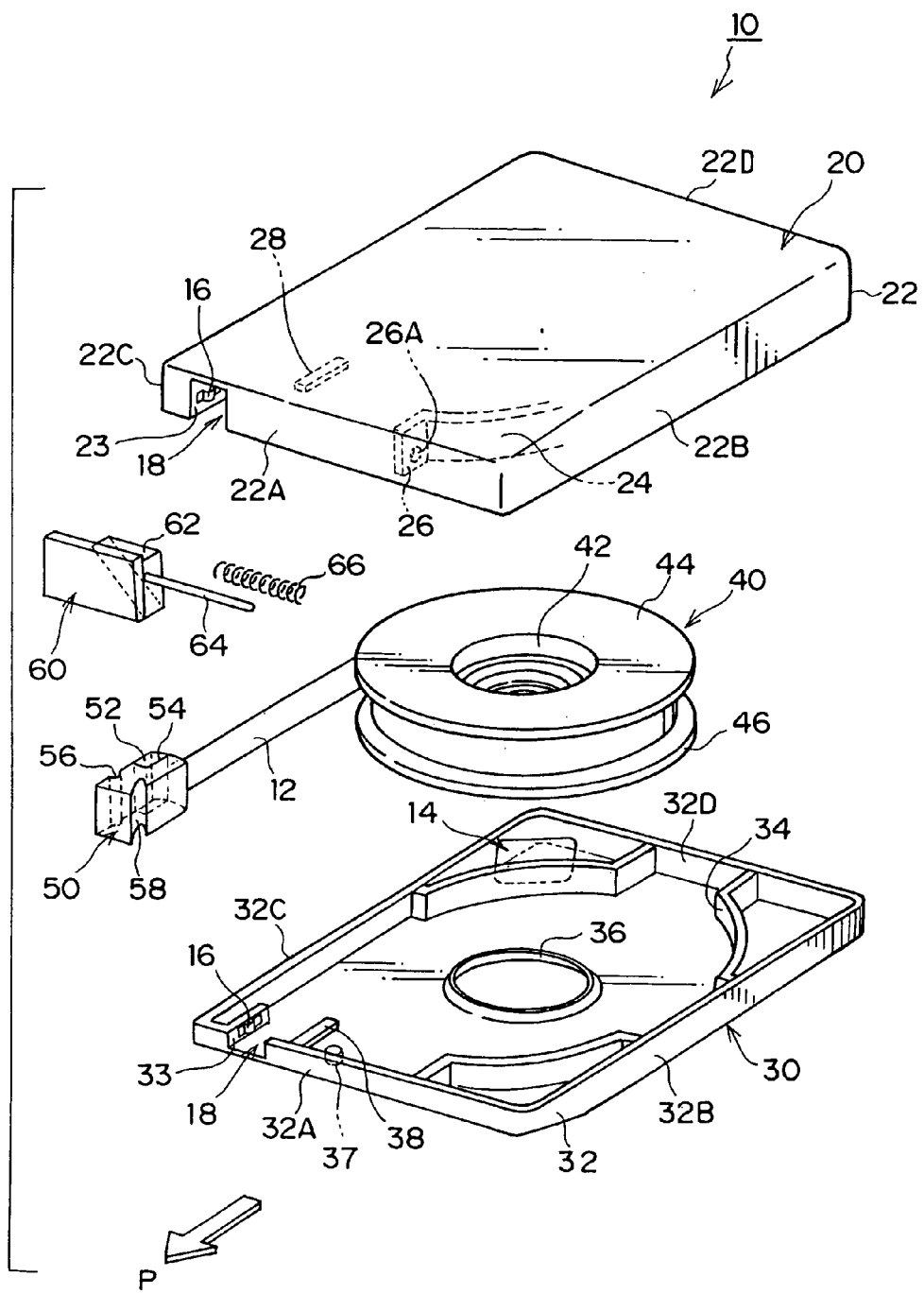
FIG. 1 is an exploded perspective view of a recording tape cartridge pertaining to an embodiment of the invention.

An embodiment of the invention will be described below with reference to the drawings. For convenience of explanation, the direction in which a recording tape cartridge is loaded into a drive device (bucket) is indicated by the direction of arrow P in FIG. 1. The direction of arrow P indicates the front direction of the recording tape cartridge, and front/rear, left/right, and upper/lower will be expressed using the direction of arrow P as a reference. Further, a magnetic tape is utilized for a recording tape, and a magnetic tape cartridge will be described hereinafter.

As shown in FIGS. 1 through 3A and 3B, a magnetic tape cartridge 10 is formed in a substantially rectangular box shape and comprises an upper case 20 and a lower case 30, both of which are made of synthetic resin, that are joined by ultrasonic welding in a state in which mutual peripheral walls 22 and 32 abut against each other. A single reel 40, around which is wound magnetic tape 12 that serves as a medium for recording and playing back information, is rotatably housed within the joined upper case 20 and lower case 30. That is, play regulating walls 24 and 34, which form a substantially cylindrical shape, are respectively vertically disposed within the upper case 20 and the lower case 30 so as to be substantially vertically symmetrical, and the reel 40 is housed within the play regulating walls 24 and 34.

Figure 9:
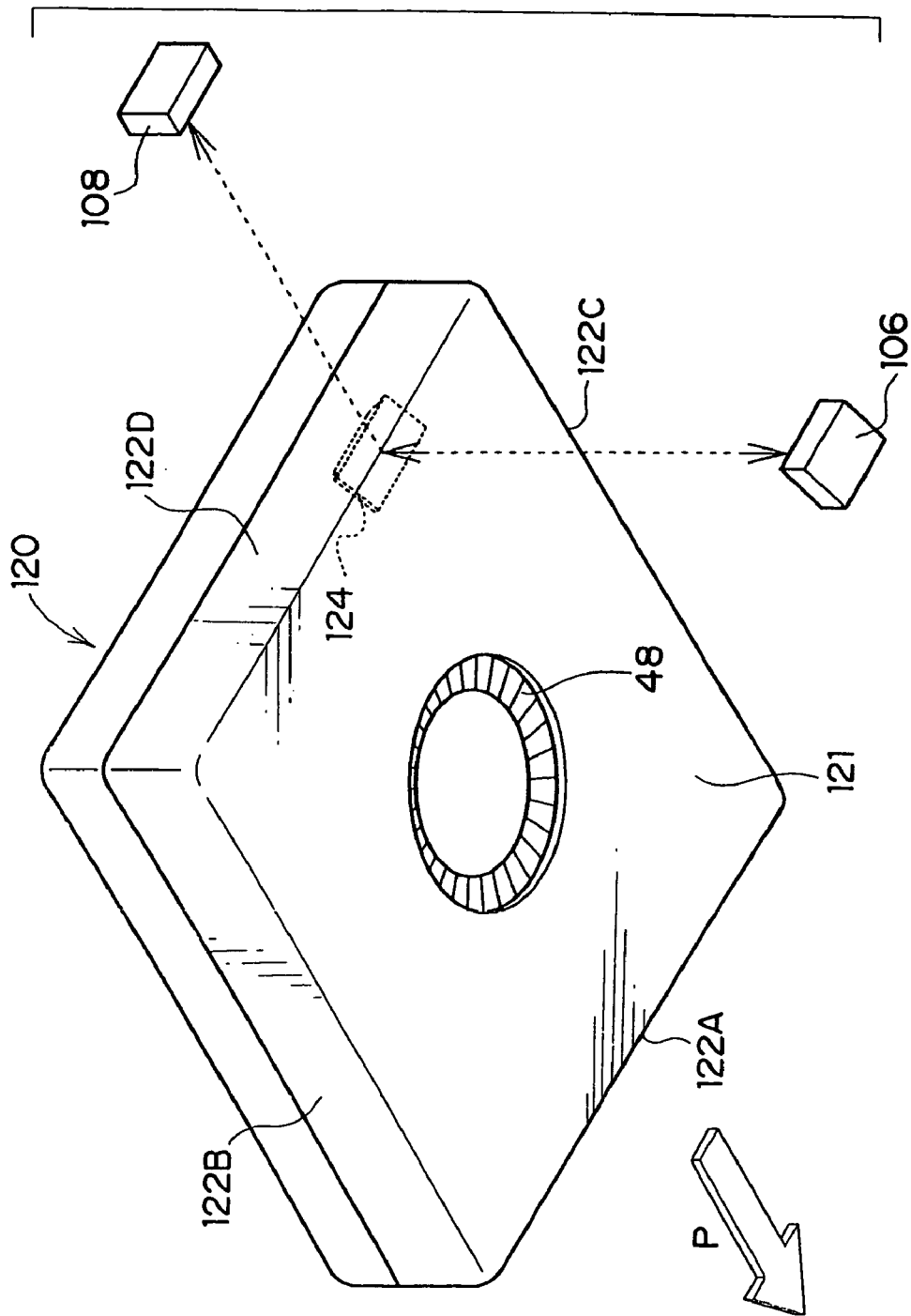
FIG. 9 is a schematic perspective view of a conventional recording tape cartridge.

An annular hole 36 penetrates a center of the lower case 30, and a reel gear 48 (see FIG. 9) that is annularly disposed at a lower surface of the reel 40 appears through the hole 36. The reel 40 includes a cylindrical reel hub 42 and a lower flange 46 that extends in a radial direction from a lower end outer periphery of the reel hub 42, and the reel hub 42 and the lower flange 46 are integrally formed of synthetic resin. Additionally, an upper flange 44, which has the same shape as the lower flange 46, is joined by ultrasonic welding to an upper end of the reel hub 42.

A substantially rectangular opening 18, through which the magnetic tape 12 wound around the reel 40 is pulled out, is formed near a right corner of front walls 22A and 32A of the upper case 20 and the lower case 30. The opening 18 is closed off by a door 60, which opens and closes off the opening 18, when the magnetic tape cartridge 10 is not in use (e.g., when the magnetic tape cartridge 10 is not loaded in a drive device 100 in FIGS. 6 and 7). A leader block 50, which is attached to a leading end of the magnetic tape 12, is retained at an inner side of the door 60 at the upper case 20 and the lower case 30.

The leader block 50 has a substantially rectangular block shape and includes a fitting portion 54, a recess 56, and an engagement portion 58. The fitting portion 54 is formed at a rear end side of the leader block 50, has a substantially rectangular shape when seen in plan view, and is fitted with a fixed member 52 that is made of synthetic resin and in which at least a surface thereof that contacts the magnetic tape 12 has elasticity. The recess 56 is substantially arcuate when seen in plan view and is formed only at a right side surface. The engagement portion 58 is formed at a front end side of the leader block 50, is substantially arcuate when seen in plan view, and engages with a pull-out member (not illustrated) of the drive device 100. The leader block 50 is fixed to the leading end of the magnetic tape 12 by the fixed member 52 being fitted into the fitting portion 54, with the leading end portion of the magnetic tape 12 being sandwiched between the fixed member 52 and the fitting portion 54.

Inner walls 23 and 33 that are parallel to right walls 22C and 32C of the upper case 20 and the lower case 30 extend by a predetermined length (slightly shorter than the front-rear direction length of the leader block 50) in the direction of the reel 40 at the opening 18 end of the right walls 22C and 32C. A metal elastic member 16, which is elastically deformable in the left-right direction and includes a center that projects in a substantially arcuate shape when seen in plan view, is attached to each of the inner walls 23 and 33.

Guide rails 28 and 38, which have a predetermined length (smaller than the front-rear direction length of the leader block 50) and against which a left side surface of the leader block 50 slidably abuts, are respectively disposed to project from inner surfaces of the upper case 20 and the lower case 30 near the opening 18. The guide rails 28 and 38 are disposed in a straight line so that they are parallel to left side walls 22B and 32B and the right walls 22C and 32C of the upper case 20 and the lower case 30, i.e., parallel to the direction in which the magnetic tape cartridge 10 is loaded into the drive device 100 (the direction of arrow P).

The left end side of the leader block 50 is supported at the guide rails 28 and 38, and a center portion (the portion that is substantially arcuate when seen in plan view) of each of the elastic members 16 engages with the recess 56 formed in the right side surface of the leader block 50. Thus, the leader block 50 is retained at the inner side of the opening 18. It should be noted that each of the guide rails 28 and 38 is, of course, disposed with a length and at a position that do not interfere with the reel 40, and the height of each of the guide rails 28 and 38 is a height that does not interfere with the magnetic tape 12 when the leader block 50 is being pulled out.

Figure 3A:
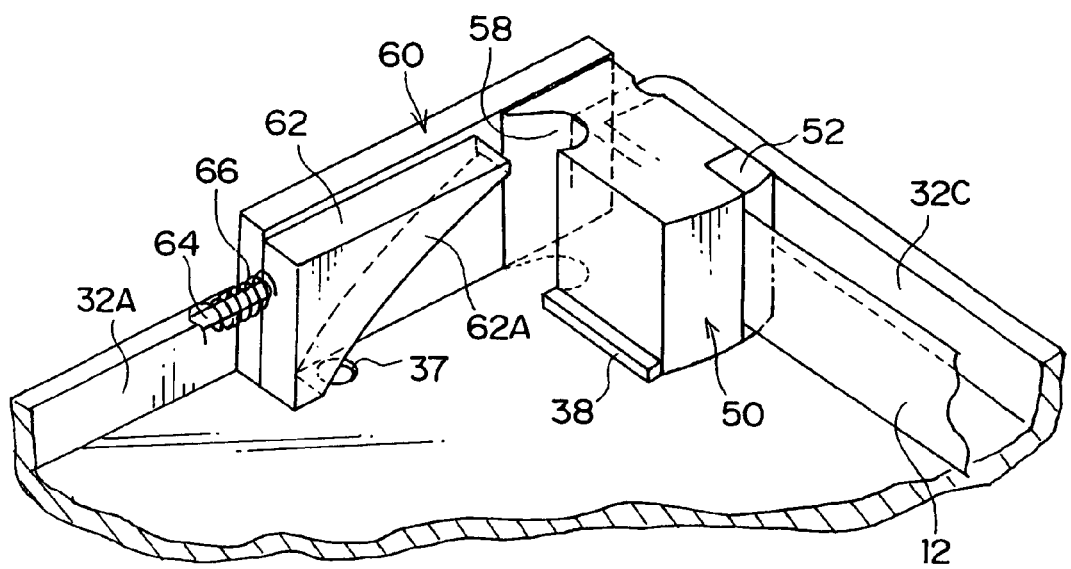
FIG. 3A is an explanatory view showing an opening operation of a door in the recording tape cartridge pertaining to the embodiment of the invention, and illustrates a state in which the door is closed.
Figure 3B:
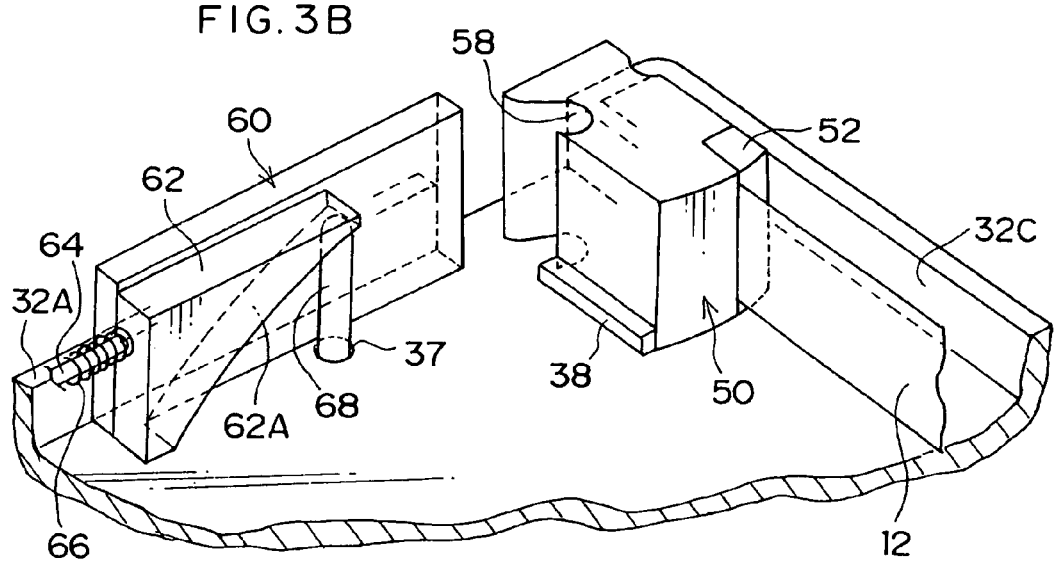
FIG. 3B is an explanatory view showing an opening operation of the door in the recording tape cartridge pertaining to the embodiment of the invention, and illustrates a state in which the door is open.
Figure 8:
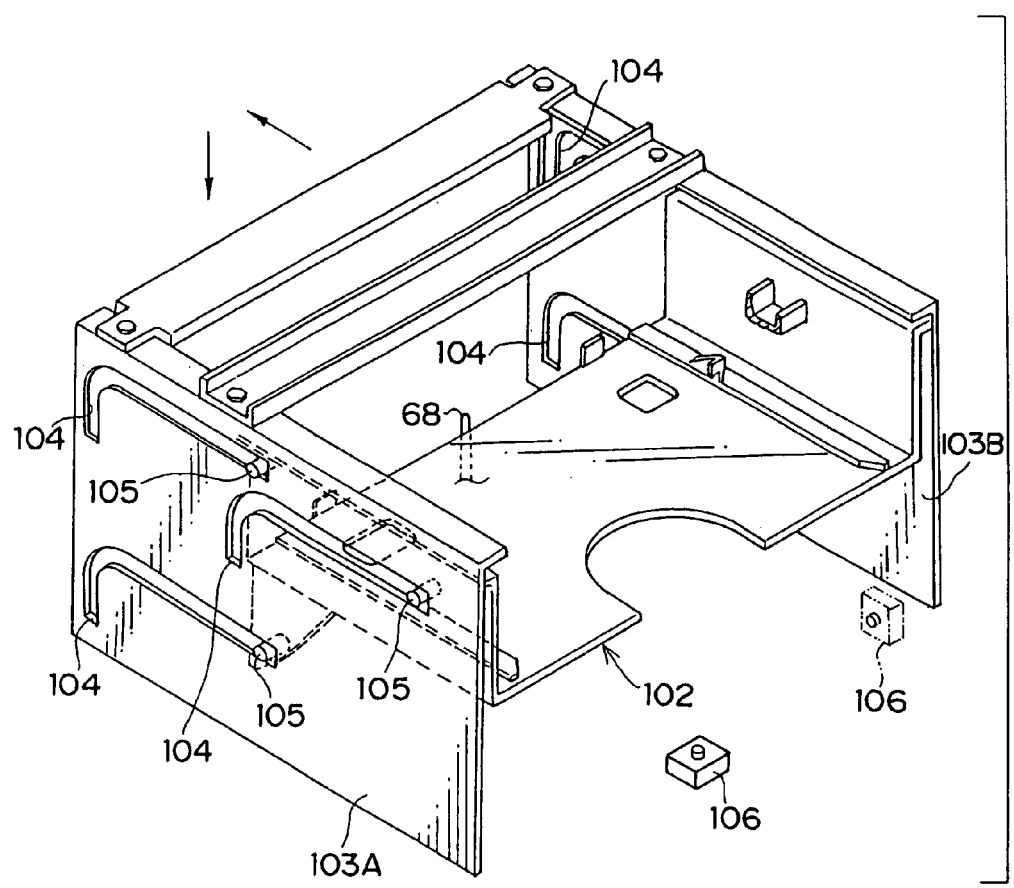
FIG. 8 is a schematic perspective view of a bucket pertaining to the embodiment of the invention.

The door 60 is long in the left-right direction, is formed in a tabular shape of a predetermined height (substantially the same height as the height of each of the inner surfaces of the front walls 22A and 32A), and is ordinarily urged in the direction (i.e., the right direction) in which the door 60 closes the opening 18 by a coil spring 66 that presses a left end surface of the door 60. As shown in FIGS. 3A and 3B, a cam 62, which has a substantial right triangle shape when seen in front view and includes a lower surface 62A that slopes to the left to form a slanted and curved surface, is integrally fixed at a left side of a rear surface of the door 60. A through hole 37, into which is inserted and passed an engagement pin 68 that abuts against the lower surface 62A of the cam 62, penetrates the lower case 30. The engagement pin 68 is disposed at the drive device 100, and is inserted into and passed through the through hole 37 and serves to position the magnetic tape cartridge 10 when the magnetic tape cartridge 10 is loaded into the drive device 100 (i.e., when a bucket 102 of FIG. 8 is lowered).

When the magnetic tape cartridge 10 is loaded into the drive device 100, the bucket 102 is lowered, and the engagement pin 68 is inserted through the through hole 37 and into the magnetic tape cartridge 10, a tip of the engagement pin 68 abuts against the lower surface 62A of the cam 62 and presses upward against the lower surface 62A. Because the lower surface 62A of the cam 62 is a slanted and curved surface that slopes to the left, the cam 62 slides leftward while it is guided by the tip of the engagement pin 68, and the door 60, to which the cam 62 is fixed, slides leftward counter to an urging force of the coil spring 66. Thus, the opening 18 is opened, as shown in FIG. 3B.

Figure 2:
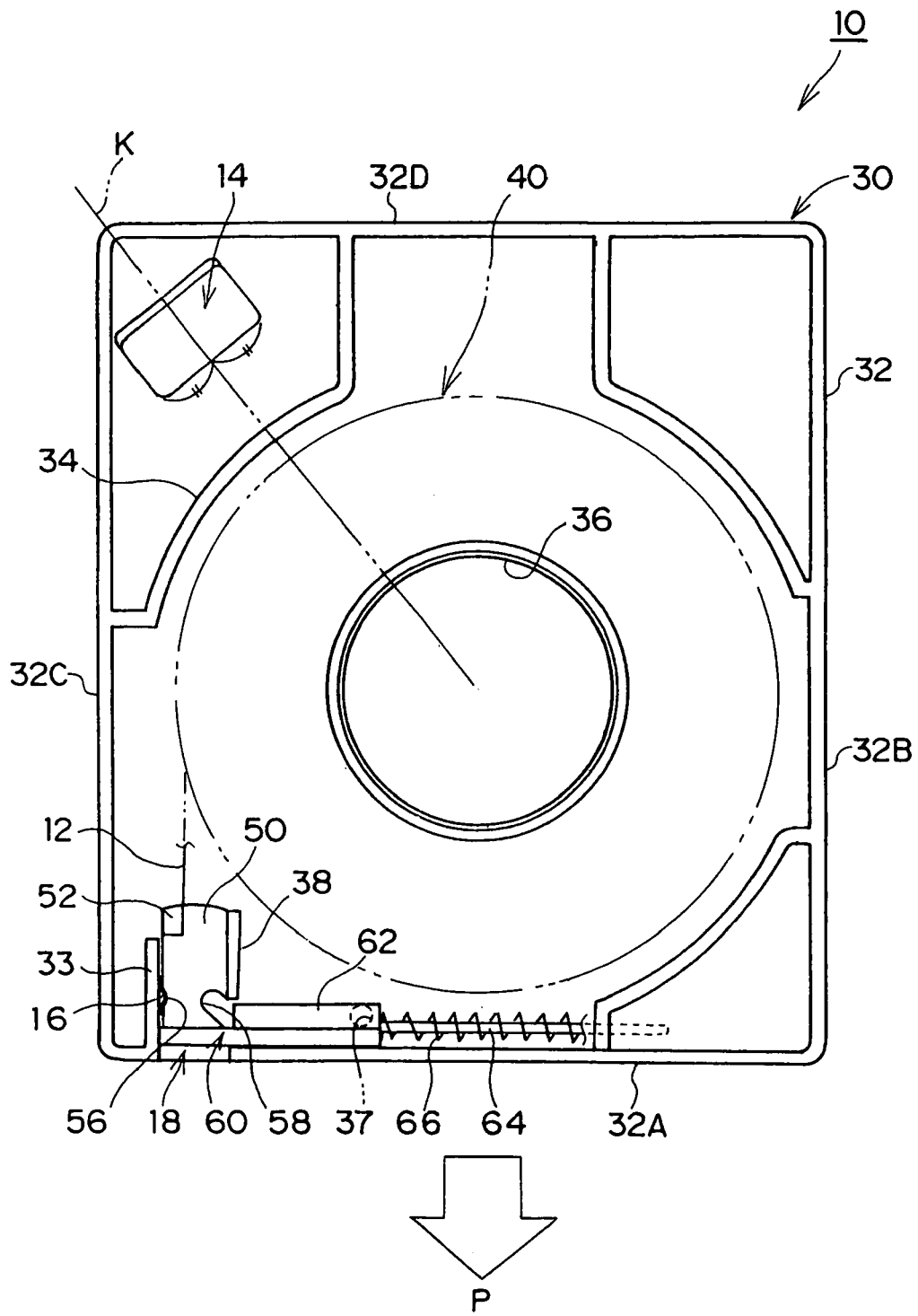
FIG. 2 is a plan view showing the recording tape cartridge of FIG. 1 in a state in which an upper case has been removed.

With respect to the structure by which the door 60 is urged rightward (i.e., in the direction in which the opening 18 is closed) by the coil spring 66, as shown in FIG. 2, a shaft 64 is integrally disposed at a substantially center portion of a left end surface of the door 60, a through hole 26A, through which the shaft 64 is passable, is disposed at a predetermined position in a connecting wall 26 that integrally connects the play regulating wall 24 of the upper case 20 with an inner surface of the front wall 22A, and a tip of the shaft 64 is inserted into and passed through the through hole 26A after the coil spring 66 has been wound around the shaft 64. It should be noted that, although the shaft 64 is used in the present embodiment, the invention is not limited thereto, and an optional structure may be adopted.

Additionally, the cam 62 may also be fixed as a separate entity to the rear surface of the door 62 or be integrally formed with the door 60. Because the tip of the engagement pin 68 abuts against the lower surface 62A of the cam 62 and slides along the lower surface 62A, it is preferable that the cam 62 be formed with a curved surface. Moreover, in view of preventing the ingress of dust and the like, it is preferable that a lid member (not illustrated) that can close off the through hole 37 of the lower case 30 be disposed when the magnetic tape cartridge 10 is not in use.

A substantially rectangular, thin, tabular memory board 14 is disposed at an inner side of the right rear corner of the lower case 30. At least various generational information, such as the type, recording capacity, and recording format of the magnetic tape 12, is stored in the memory board 14. The information stored in the memory board 14 is noncontactingly read by an electromagnetic wave that is transmitted and received from a reading and writing device 106 disposed at the drive device 100 (see FIG. 8) and by a reading device 108 disposed at a robotic hand 90 of a library 70 (see FIGS. 6 and 7).

Figure 4:
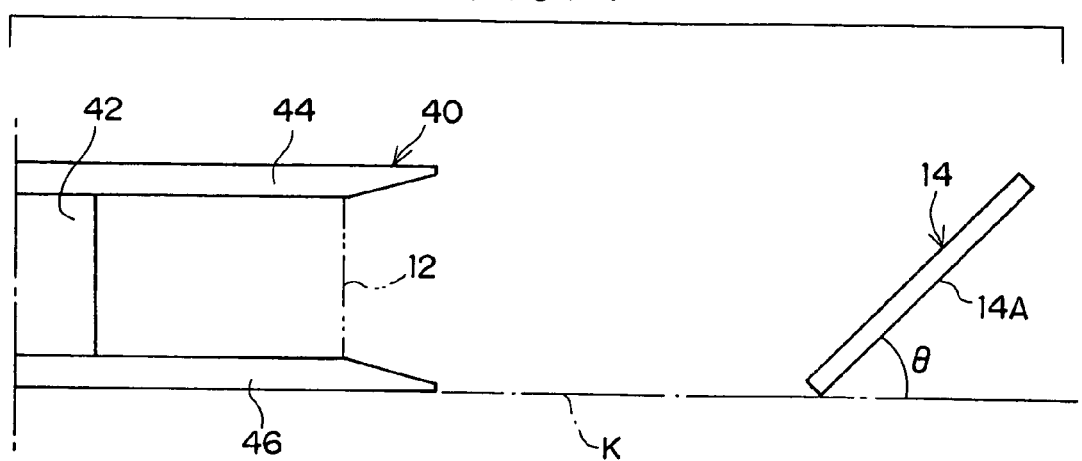
FIG. 4 is a schematic side view showing the relation between a memory board and a reel of the recording tape cartridge pertaining to the embodiment of the invention.

That is, as shown in FIGS. 2 and 4, the noncontacting-type memory board 14 is slantingly disposed by an unillustrated retention mechanism at a 45° wave angle θ with respect to an imaginary line K drawn from a center of the reel 40 to the right rear corner, so that the imaginary line K is positioned on a left-right transverse direction center of the memory board 14, and so that the right end contacts or nears the inner surfaces of the right walls 22C and 32C and the left end contacts or nears the inner surfaces of the rear walls 22D and 32D.

Figure 5A:
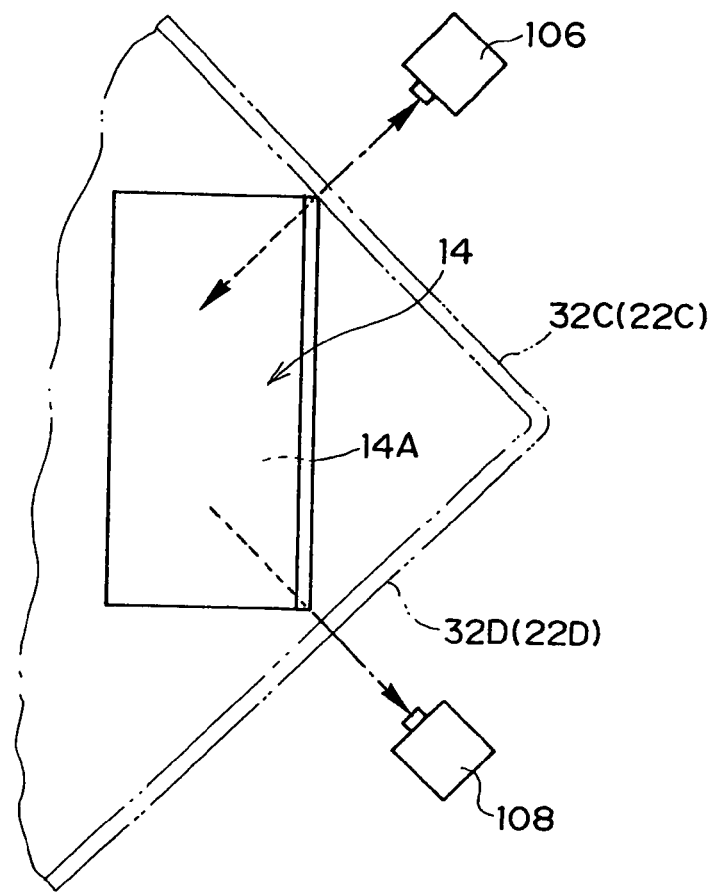
FIG. 5A is a schematic plan view showing a reading and writing device, a reading device, and the memory board of the recording tape cartridge pertaining to the embodiment of the invention.
Figure 5B:
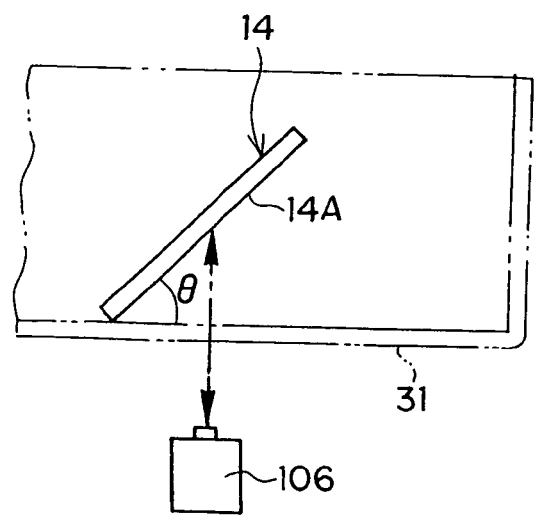
FIG. 5B is a schematic side view showing the reading and writing device and the memory board of the recording tape cartridge pertaining to the embodiment of the invention.
Figure 5C:
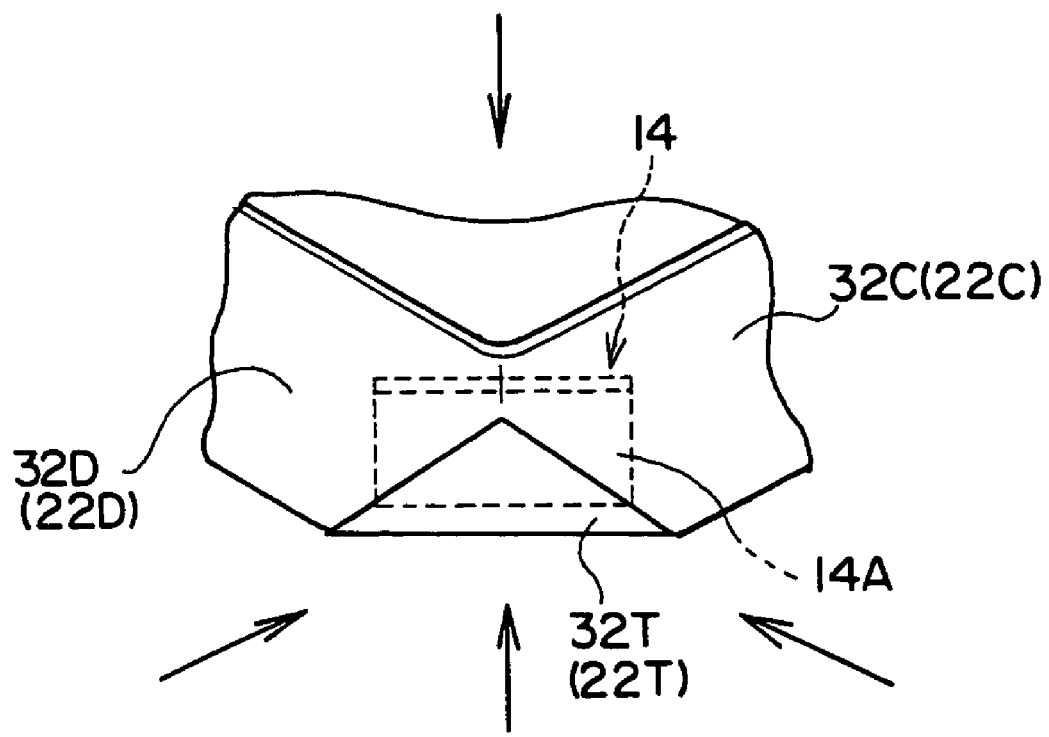
FIG. 5C is a schematic perspective view showing an example of a variant corner portion of the recording tape cartridge pertaining to the embodiment of the invention.

When the memory board 14 is disposed in this manner, it is possible for a communication surface 14A of the memory board 14 to be seen from the lower surface 31 side of the lower case 30, from the rear walls 22D and 32D side, and from the right walls 22C and 32C side (i.e., from a side surface), as shown in FIGS. 5A and 5B. For this reason, reading and writing is not only possible from the lower surface 31 and from the rear walls 22D and 32D, as has conventionally been the case, but also from the right walls 22C and 32C (i.e., from a side surface side). Further, as shown in FIG. 5C, in a case in which a corner portion of the lower case 30, at which the memory board 14 is disposed, is slanted, reading and writing of the communication surface 14A of the memory board 14 is not only possible from three directions, such as the lower surface 31 side, the rear wall 22D and 32D sides, and the right wall 22C and 32C sides, but also from between the rear walls 22D and 32D and right walls 22C and 32C, i.e., from the slanted surface 32T (22T). It should be noted that, although the communication surface 14A in the present embodiment is a transmission and reception surface capable of reading and writing information, the communication surface 14A may also simply be a reception surface or a transmission surface. Further, it should be noted that electromagnetic wave or magnetic field or the like may be utilized as the communication system for communicating with the memory board 14.

In other words, because it becomes possible to expand, from two directions to three directions, the relative positions of the reading device 108 and the reading and writing device 106, which are disposed at the library 70 and the drive device 100, with respect to the magnetic tape cartridge 10, it is possible to increase the freedom with which the library 70 and the drive device 100 are designed.

Although it is best that the memory board 14 be disposed at the 45° wave angle θ with respect to the imaginary line K as described above, the angle θ may be altered as long as it is in the range of 30° to 60°. It is also best that the imaginary line K be disposed on the center (i.e., on a bisector in the transverse direction) of the memory board 14. That is, it is best that the imaginary line K is disposed such that a normal line of the communication surface 14A of the memory board 14 coincides with a plane that passes through the imaginary line K and extends in the thickness direction of the case. However, the position of the imaginary line K may also be slightly offset as long as it is within a range in which reading and writing are possible. Whatever the case may be, it suffices as long as the memory board 14 is disposed so that access from the above-described three directions becomes possible.

Although it is not illustrated, the right rear corner underside of the lower case 30 may be formed as a slanted wall parallel to the memory board 14. In this instance, the mechanism by which the memory board 14 is retained can be simplified. Also, because the memory board 14 is configured so that information can be read noncontactingly, there is no need to dispose a hole other than a reference hole for positioning (dimensional reference hole), such as a hole for discriminating recording capacity that has conventionally been disposed, at the upper case 20 and the lower case 30. Thus, case strength can be improved. It should be noted that, although the memory board 14 is disposed at the right rear corner in the present embodiment, the invention is not limited thereto. For example, the memory board 14 may also be disposed at the left rear corner. The side surface in that instance becomes the left walls 22B and 32B.

Figure 6:
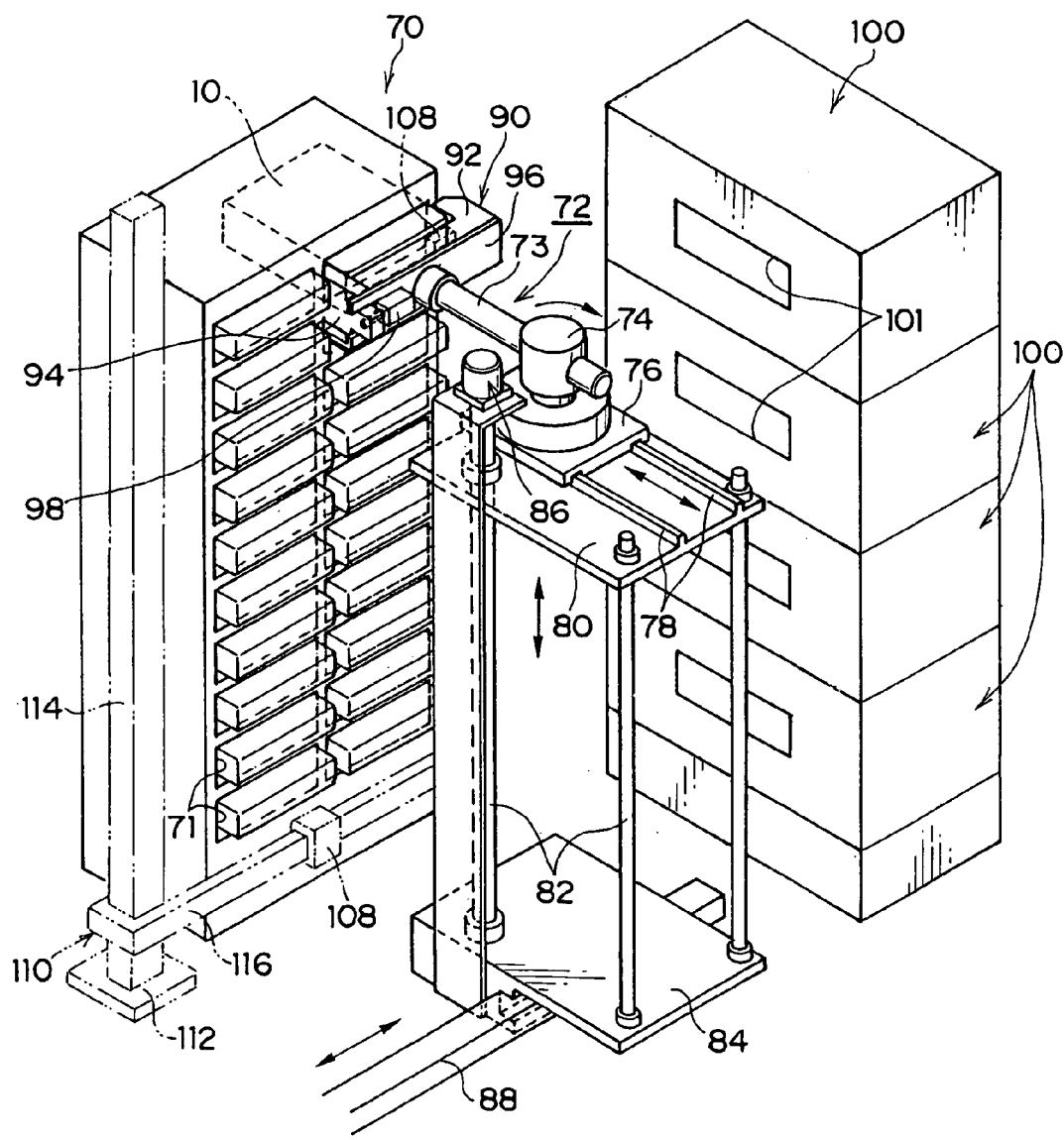
FIG. 6 is a schematic perspective view showing a drive device and a library pertaining to the embodiment of the invention.
Figure 7:
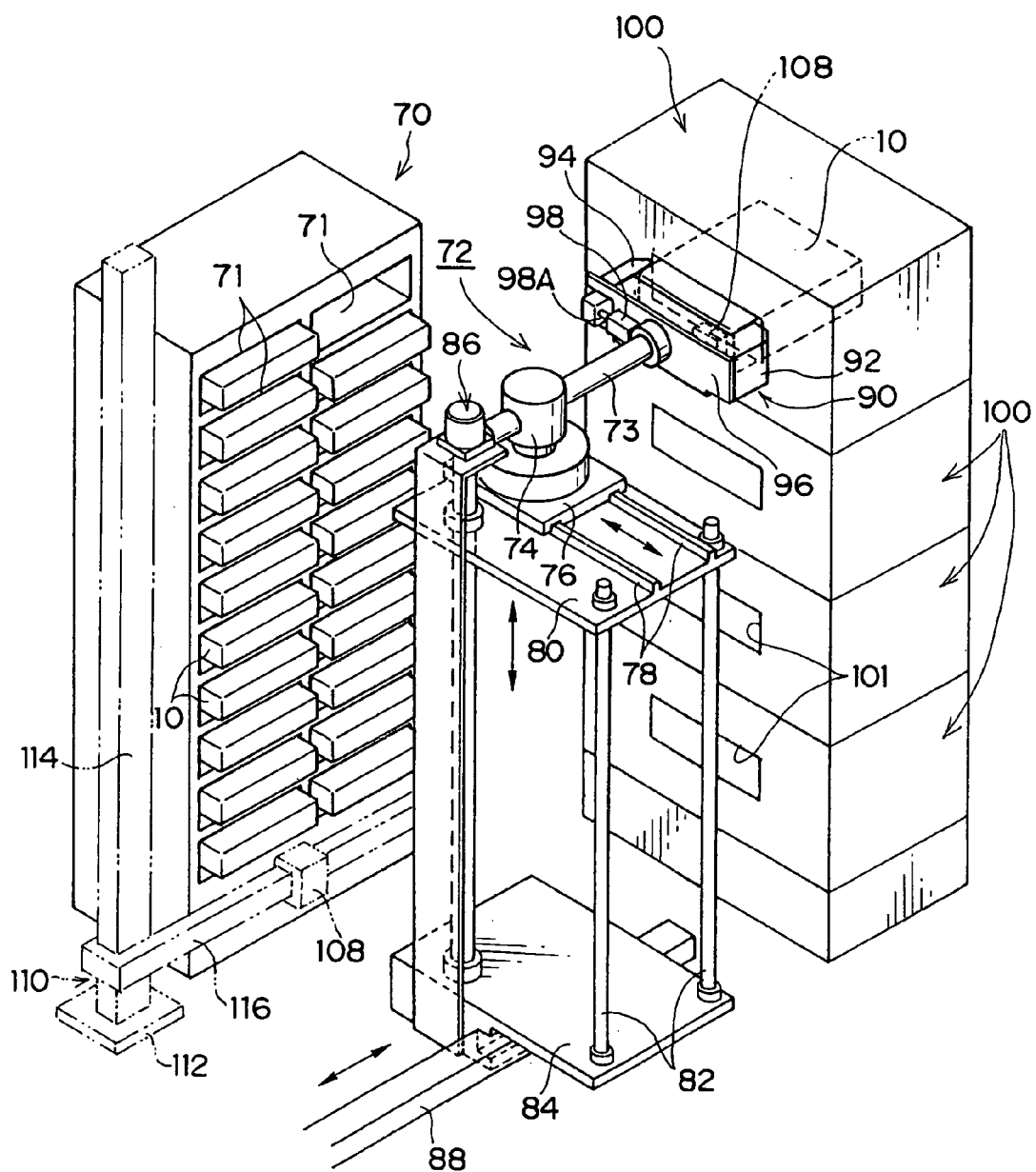
FIG. 7 is a schematic perspective view showing the drive device and the library pertaining to the embodiment of the invention.

Next, description will be given of the library 70 that houses the magnetic tape cartridge 10. As shown in FIGS. 6 and 7, a gripping mechanism 72 disposed at the library 70 automatically extracts the magnetic tape cartridge 10 from the library 70, loads the magnetic tape cartridge 10 into the drive device 100, extracts the magnetic tape cartridge 10 from the drive device 100, and again returns the magnetic tape cartridge 10 to the library 70. The gripping mechanism 72 is structured so that it can move freely between the library 70 and the drive device 100.

That is, an arm 73, which includes an end to which the robotic hand 90 is attached, is fixed to a swing device 74 and is freely swingable between the library 70 and the drive device 100. The swing device 74 is fixed on a base 76, and the base 76 is slideable along rails 78 disposed on a support platform 80.

The support platform 80 can be raised and lowered, by a driving force transmitted thereto from an elevation device 86, along guide rods 82 that are vertically disposed from carrier 84. The carrier 84 is moveable along a rail 88 that is disposed in a direction orthogonal to the rails 78. Accordingly, the robotic hand 90, which is attached to the end of the arm 73, can freely move between each housing unit 71 and each loading port 101 of the drive device 100.

The robotic hand 90 has a substantial square-"U" shape when seen in plan view, and is attached to an end of a piston rod 98A of a cylinder 98, in which a first claw unit 92 is integrally formed with a support 96 and a second claw unit 94 is attached to the support 96. The distance between the first claw unit 92 and the second claw unit 94 is adjusted by extending and contracting the piston rod 98A, so that the rear end sides of the left walls 22B and 32B and right walls 22C and 32C of the magnetic tape cartridge 10 can be appropriately gripped.

The reading device 108, which noncontactingly reads the various information stored in the memory board 14 disposed at the magnetic tape cartridge 10, is disposed at the robotic hand 90. That is, because the first claw unit 92 and the second claw unit 94 grip the rear end sides of the left walls 22B and 32B and right walls 22C and 32C of the magnetic tape cartridge 10 from the outside, the support 96 faces the rear walls 22D and 32D. The reading device 108 is disposed at a right side inner surface of the support 96, and accesses the memory board 14 from the rear walls 22D and 32D of the magnetic tape cartridge 10.

Accordingly, when the robotic hand 90 grips the magnetic tape cartridge 10, the various information such as the recording capacity of the magnetic tape cartridge 10 is read by the reading device 108, and the read information is transmitted to a control device (not illustrated). The drive device 100 that is suited for the magnetic tape cartridge 10 gripped by the robotic hand 90 is preselected, and the magnetic tape cartridge 10 is smoothly loaded into one of the plurally disposed drive devices 100.

In other words, because the drive device 100 that is capable of recording and playing that particular magnetic tape cartridge 10 is identified by the control device in advance by reading the various information of each magnetic tape cartridge 10, movement from the library 70 to the drive device 100 is smoothly carried out. Thus, the time at which data writing is initiated (time at which access is initiated) can be shortened, and data processing efficiency can be improved.

The reading device 108 may also be disposed at a scan device 110 that can face each housing unit 71 of the library 70, without disposing the reading device 108 at the robotic hand 90. As shown in FIGS. 6 and 7 by imaginary lines, the scan device 110 mainly comprises a first rail 114, which is disposed perpendicular to a support platform 112, a second rail 116, which is disposed in a direction orthogonal to the first rail 114 and is raiseable and lowerable along the first rail 114, and the reading device 108, which is moveably attached to the second rail 116. The scan device 110 is structured so that the reading device 108 is moveable in a width direction and in a height direction.

Accordingly, the reading device 108 can access the memory board 14 from the rear surface (i.e., the rear walls 22D and 32D) of the magnetic tape cartridge 10 housed in the library 10, and can read the various information stored in the magnetic tape cartridge 10. Thus, it becomes possible to transmit to the control device the various information of all of the magnetic tape cartridges 10 housed in the respective housing units 71 before the robotic hand 90 grips the magnetic tape cartridges 10 and to select in advance the most appropriate drive device 100 for each of the magnetic tape cartridges 10 on the basis of the transmitted information.

Therefore, the movement of the recording tape cartridge 10 from the library 70 to the drive device 100 is smoothly and efficiently conducted, the time at which data writing is initiated (time at which access is initiated) can be shortened, and data processing efficiency can be improved. It should be noted that the scan device 110 is not limited to the structure described above. Any structure may be used as long as the reading device 108 is moveable in the transverse direction and in the height direction.

Next, description will be given of the bucket 102 of the drive device 100 into which the magnetic tape cartridge 10 is loaded. As shown in FIG. 8, three guide pins 105 apiece are projectingly disposed at each of left and right end surfaces of the bucket 102. These guide pins 10S are respectively inserted into and supported at three guide holes 104 that are substantially "L" shaped when seen in side view and disposed at each of left and right side walls 103A and 103B within the drive device 100. Thus, the bucket 102 is moveable along the guide holes 104. In the drive device 100, the reading and writing device 106, which noncontactingly reads the various information stored in the memory board 14 of the magnetic tape cartridge 10 and, if necessary, noncontactingly writes new information, is disposed at a predetermined position below the bucket 102. Also, the engagement pin 68 is disposed at another position below the bucket 102.

Accordingly, the magnetic tape cartridge 10 is mounted on the bucket 102 when the magnetic tape cartridge 10 is inserted through the loading port 101 of the drive device 100, and the bucket 102 on which the magnetic tape cartridge 10 is mounted first moves horizontally as it is guided in the guide holes 104. Next, the bucket 102 is lowered in the vertical direction, and the reel gear 48 (see FIG. 9) of the magnetic tape cartridge 10 is made to mesh with a drive gear (not illustrated) of the drive device 100. The engagement pin 68 of the drive device 100 is inserted into and passed through the through hole 37 of the magnetic tape cartridge 10, whereby the door 60 is opened.

When the magnetic tape cartridge 10 is completely loaded into the drive device 100, the reading and writing device 106 accesses the memory board from the lower surface 31 of the magnetic tape cartridge 10, reads the information stored in the memory board 14, and, depending on the situation, writes new information in the memory board 14. As described above, because the memory board 14 is disposed so as to be accessible from three directions, it is possible to access the memory board 14 even in instances where the reading and writing device 106 is disposed at the right side wall 103B indicated by the imaginary line due to the design of the drive device 100 being altered.

A series of actions of the magnetic tape cartridge 10, the library 70, the gripping mechanism 72, and the drive device 100 will now be described. When the magnetic tape cartridge 10 is not in use (e.g., when the magnetic tape cartridge 10 is not loaded in the drive device 100), the opening 18 in the magnetic tape cartridge 10 is closed off by the door 60. At this time, upper and lower edges of the left side surface of the leader block 50 abut against the guide rails 28 and 38 that are respectively disposed at the upper case 20 and the lower case 30, and the leader block 50 is retained at a predetermined position by the recess 56 of the leader block 50 engaging with the elastic members 16 disposed at the inner walls 23 and 33.

Each of the magnetic tape cartridges 10 is housed in this state in the respective housing units 71 of the library 70. Next, when a desired magnetic tape cartridge 10 is to be extracted from the library 70, the reading device 108 disposed at the robotic hand 90 (or at the scan device 110) accesses the memory boards 14 from the rear surface sides (from the rear walls 22D and 32D) of the magnetic tape cartridges 10, reads the various stored information such recording capacity, and transmits the read information to the control device.

Thus, the most appropriate drive device 100 (capable of recording and playing each magnetic tape cartridge 10) for each magnetic tape cartridge 10 is identified in advance by the control device, and each magnetic tape cartridge 10 is smoothly and efficiently loaded through the respective loading ports 101 of the drive devices 100 by the gripping mechanism 72 disposed with the robotic hand 90.

When the magnetic tape cartridge 10 is mounted in the bucket 102 through the loading port 101 of the drive device 100, the bucket 102 moves along the guide holes 104, and the drive gear and the reel gear 48 are made to mesh due to the bucket 102 being lowered to a predetermined position. At this time, the engagement pin 68 that is projectingly disposed at a predetermined position is inserted into the magnetic tape cartridge 10 through the through hole 37, and the tip of the engagement pin 68 abuts and presses against the lower surface of the cam 62 disposed at the rear surface of the door 60. Thus, the lower surface of the cam 62 slides leftward while contacting and engaging the end of the engagement pin 68, and the door 60 is moved leftward. Accordingly, the opening 18 is opened.

When the magnetic tape cartridge 10 is loaded into the bucket 102, the reading and writing device 106 disposed below the bucket 102 accesses the memory board 14 from the lower surface 31 of the magnetic tape cartridge 10, reads the various stored information, and, if necessary, writes separate information.

After the opening 18 of the magnetic tape cartridge 10 has been opened, the pull-out member of the drive device 100 is inserted through the opening 18, engages with the engagement portion 58 disposed at the front end of the leader block 50, and pulls out the leader block 50 from the opening 18. At this time, drawbacks such as the guide rails 28 and 38 interfering with the magnetic tape 12 do not occur.

The leader block 50 that has been pulled out from the opening 18 is moved toward the take-up reel (not illustrated) of the drive device 100 and fitted into a reel hub (not illustrated) of the take-up reel. Next, when the reel gear 48 is made to rotate via the drive gear, data is recorded onto the magnetic tape 12 or data recorded on the magnetic tape 12 is played back while the take-up reel is made to rotate and the magnetic tape 12 is taken up at the take-up reel.

When the magnetic tape cartridge 10 is to be extracted from the drive device 100, the magnetic tape 12 is rewound around the reel 40, and the leader block 50 is taken off the reel hub of the take-up reel and returned to the inside of the case through the opening 18 in the magnetic tape cartridge 18. At this time, the left side surface of the leader block 50 abuts against and slides along the right side surfaces of the guide rails 28 and 38, and the elastic members 16 catch in the recess 56, whereby the leader block 50 is retained at the predetermined position. Additionally, the pull-out member of the drive device 100 is released from the engagement portion 58.

When the engagement pin 68 is pulled out from the through hole 37 of the magnetic tape cartridge 10 and engagement with respect to the cam 62 is released by the bucket 102 being raised after the pull-out member of the drive device 100 is released of the engagement portion 58, the door 60 is slid rightward by the coil spring 66 and the opening 18 is closed off. Next, the magnetic tape cartridge 10 is discharged through the loading port 101 of the drive device 100, once again gripped by the robotic hand 90, conveyed to the library 70, and housed in the predetermined housing unit 71.

As described above, according to the embodiment of the invention, because it becomes possible to access the memory, in which is stored various information of the recording tape cartridge, from at least the three directions of the lower surface, the rear surface, and a side surface, there are no limits relating to access of the memory on the design of the library and the drive device. That is, the freedom with which the library and the drive device are designed is increased. Moreover, because the information is noncontactingly detected, it becomes unnecessary to dispose a hole other than a reference hole for positioning, and the case strength of the recording tape cartridge can be ensured. It should be noted that, although the memory board 14 is disposed at a corner of the case in the present embodiment, it does not have to be disposed at a corner as long as it is disposed so that the communication surface 14A of the memory board 14 faces either the left or right side of the case. However, in an instance where consideration is given to output when the reading device 108 of the reading and writing device 106 carries out transmission and reception of information with respect to the memory, it is possible to minimize the output by disposing the memory board 14 at a corner of the case as in the present embodiment, which is preferable because the distance from the reel wound with the recording tape is held to a maximum. Further, in the present embodiment, a recording tape cartridge has been described as an example for a recording medium cartridge. However, it should be noted that a recording disk cartridge, within which houses a disk medium such as a magnetic disk, an optical disk and a photomagnetic disk or the like, is included as a recording medium cartridge.

What is claimed is:

1. A recording medium cartridge that is adapted to be housed in a library, extracted from the library by a gripping mechanism, and loaded into a drive device, the recording medium cartridge comprising:

a case within which is housed a recording medium; and a memory in which is stored information relating to the recording medium and that is noncontactingly accessible by reading and writing devices disposed at the drive device and at the gripping mechanism, wherein a communication surface of the memory is disposed within the case at an angle at which the memory is accessible from at least three directions, wherein the case is substantially rectangular and the memory is disposed so that the communication surface faces a corner of the case, and wherein at least a portion of a surface of the corner of the case which the communication surface faces is formed to incline at a predetermined angle with respect to a lower surface of the case.

2. The recording medium cartridge of claim 1, wherein the communication surface of the memory slants at an acute angle with respect to the lower surface of the case.

3. The recording medium cartridge of claim 2, wherein the communication surface of the memory slants at an angle of 30° to 60° with respect to the lower surface of the case.

4. The recording medium cartridge of claim 3, wherein the memory slants at an angle of 45° with respect to the lower surface of the case.

5. The recording medium cartridge of claim 1, wherein the memory is disposed such that a plane which passes through a straight line extending from a center of the lower surface of the case to a corner of the case at which the memory is disposed and which extends in a thickness direction of the case substantially coincides with a normal line of the communication surface of the memory.

6. The recording medium cartridge of claim 1, wherein the memory is disposed in the case at a corner opposite from the direction in which the recording medium cartridge is loaded into the drive device.

7. The recording medium cartridge of claim 1, wherein the communication surface is a transmission surface.

8. The recording medium cartridge of claim 1, wherein the communication surface is a reception surface.

9. The recording medium cartridge of claim 1, wherein the at least three directions include a lower surface side, a rear surface side, and a side surface side of the case.

10. The recording medium cartridge of claim 1, wherein the inclined surface of the case which the communication surface faces is formed so as to be substantially parallel to the communication surface.

11. The recording medium cartridge of claim 1, wherein the inclined surface of the case which the communication surface faces is formed to have a polygonal shape.

12. The recording medium cartridge off claim 11, wherein the inclined surface is formed to have a triangular shape.

* * * * *

UNITED STATES PATENT AND TRADEMARK OFFICE
CERTIFICATE OF CORRECTION

PATENT NO. : 7,145,751 B2 Page 1 of 1
APPLICATION NO. : 11/222861
DATED : December 5, 2006
INVENTOR(S) : Kazuo Hiraguchi It is certified that error appears in the above-identified patent and that said Letters Patent is hereby corrected as shown below:

In claim 12, column 12, line 39, please delete "off" and replace with --of--.

Signed and Sealed this

Twelfth Day of June, 2007

JON W. DUDAS
*Director of the United States Patent and Trademark Office*